UNITED STATES PATENT OFFICE.

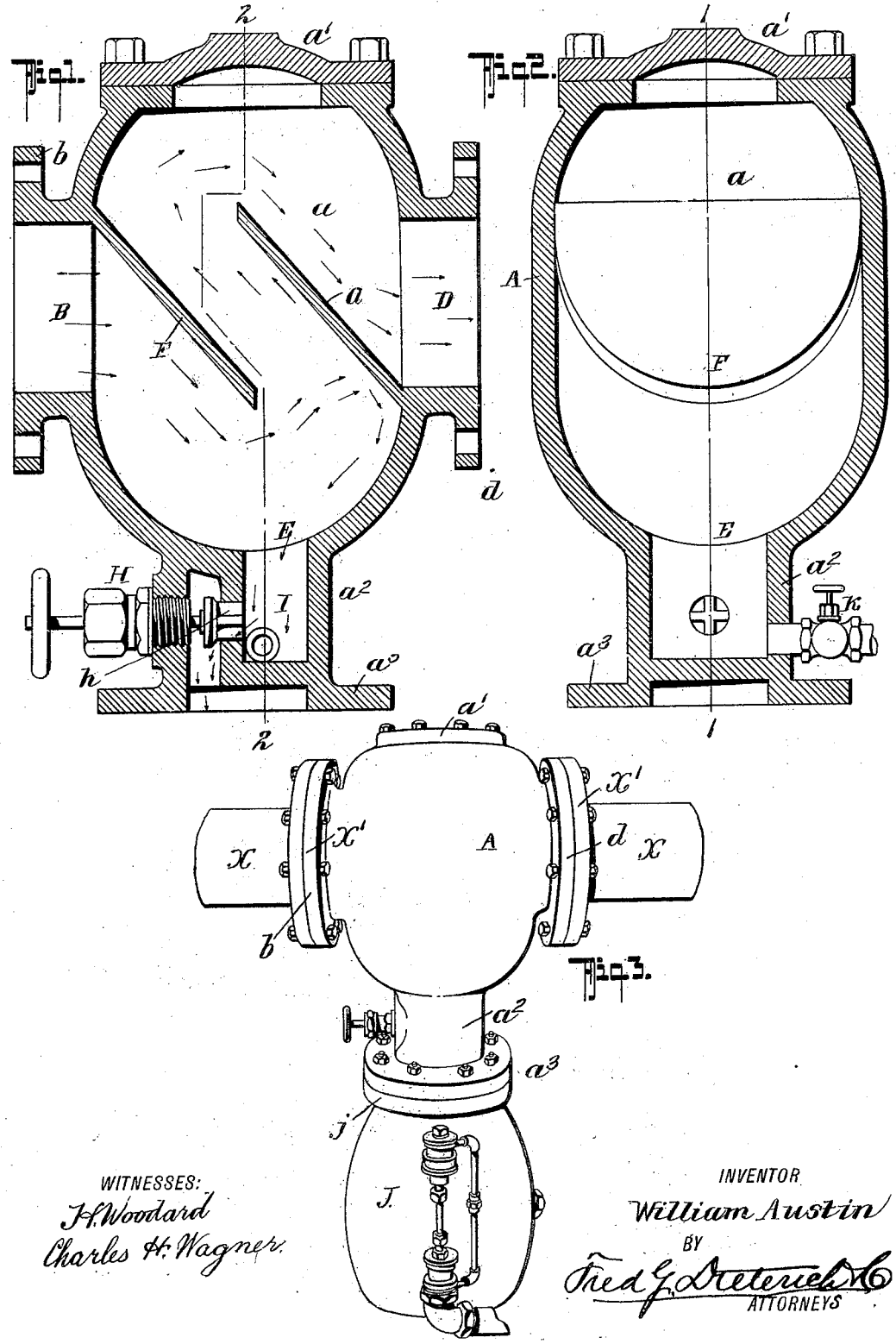

WILLIAM AUSTIN, OF SCRANTON, PENNSYLVANIA, ASSIGNOR TO THE DELAHUNTY DYEING MACHINE COMPANY, A CORPORATION OF NEW JERSEY.

AUTOMATIC STEAM-SEPARATOR.

No. 917,400.            Specification of Letters Patent.            Patented April 6, 1909.

Application filed October 15, 1908. Serial No. 457,937.

*To all whom it may concern:*

Be it known that I, WILLIAM AUSTIN, residing at Scranton, in the county of Lackawanna and State of Pennsylvania, have invented a new and Improved Automatic Steam-Separator, of which the following is a specification.

My present invention is an improved means adapted for being coupled with the main supply pipe of steam distributing systems (preferably near the engine throttle valve) for baffling the direct steam flow and separating the products of condensation therefrom, the said means comprising, generally, a casing having a semi-circular steam impacting surface located between the oppositely disposed inlet and discharge openings in the casing and baffling or interrupter devices located within the casing to coöperate with the aforesaid semi-circular impacting surface, and relatively positioned with respect to the said surface and the steam inlet and discharge openings in the casing, whereby to intercept and create a back lash or S-shaped path of movement of the steam in its cross over from the inlet to the outlet of the casing, and to neutralize the effect of the tendency of the steam current to pick up the water that is precipitated to the casing bottom, valve controlled means being also included for regulating the outflow of the products of condensation and steam cleansing from the separator casing.

In its subordinate features, my present invention consists in certain details of construction and peculiar coöperative arrangement of parts, all of which will be hereinafter fully explained, specifically pointed out in the appended claims and illustrated in the accompanying drawing, in which:—

Figure 1, is a vertical longitudinal section of my form of steam separating means, taken substantially on the line 1—1 on Fig. 2. Fig. 2, is a cross section thereof on the line 2—2 on Fig. 1 and Fig. 3, is a perspective view that shows my separator means coupled with the main steam supply pipe and with a condensation collector and eliminator.

When installed in a horizontal line of steam pipes, my present invention is arranged as best shown in Fig. 3, which shows the separator means that forms the basis of this application coupled with the main steam supply pipe and with a condensation collector and eliminator, designated J in the drawings, and which may be of any approved type.

The separating means comprises a casing A, that forms the water separating or extracting chamber $a$ provided at one side with the steam inlet B, and at the opposite side with the outlet D, said inlet and outlets having flanged faces $b$ and $d$ for conveniently connecting with adjacent flanged ends of the steam distributing pipe $x$ provided with the usual flange $x'$. At the top, casing A is also formed with a flanged opening that is normally closed by a removable cap $a'$ which opening may be readily utilized as a second steam outlet. The lower end of the casing terminates in a pendent neck $a^2$ provided with an annular flange $a^3$ for the convenient attachment thereto of the flanged end $j$ of the lower casing J as clearly shown in Fig. 3.

By referring particularly to Figs. 1 and 2, it will be seen that within the casing A are baffle plates F and G, of substantially semi-cylindrical shape, and so mounted, relatively that one, F, deflects the inflowing steam, assuming the course of the steam to be normally horizontal, and causes it to flow down the bottom line of inlet B and move in a semi-circular path over the casing bottom $a$, and since the water contained therein is heavier than the steam and moving under the same impulse and direction, the said water (condensation) has a constant tendency to escape in a line tangent to the curve or line of steam passage and is thereby caused to impact with considerable force on the curved casing bottom. By reason of deflecting the steam and causing it to engage the bottom of the casing chamber in the manner stated, the separation of the water from the steam is facilitated since the water constantly seeks the lowest level on the casing chamber bottom $a^2$ while the steam likewise has a tendency to escape in a line tangent to the curve of the bottom.

The water of condensation that accumulates on the curved bottom $a^2$ is trapped in a pocket I formed in the pendent extension or neck of the casing, the mouth E of which opens through the bottom $a^2$ and the said pocket I and mouth E is located to one side of the center or lowermost point of the bottom nearest the outgoing side of the said bottom, so as to give the steam flow the maximum down sweep over the bottom $a^3$, without interruption by reason of engaging the pocket I in its down going movement. By thus positioning the trap, it is manifest no interruption in the tendency of the steam to escape as it passes over the casing bottom can occur until it has started on its upward direction on the bottom.

The baffle plate G which is similar to baffle F, in shape, is arranged relatively parallel to the plate F but extends upwardly and inwardly over the outlet D and to a point above the top of the said outlet. It will be noticed that baffle F extends inwardly to a point just in line with the trap or pocket I while the baffle G extends inwardly and beyond the said pocket I and beyond the inner end of the said baffle F so as to positively prevent any tendency of the steam flowing directly upwardly and outwardly through the supplemental or top opening in the casing when it is used. By arranging the baffles F and G in the manner shown and as described, and combining therewith the curved bottom of the chamber $a$ the direction of the steam (see dotted arrows) is first inwardly and downwardly against the casing bottom, then upwardly and backwardly against baffle G, thence over said baffle G and through outlet D, and by arresting the steam current, baffling as stated, the effort of the said steam current to pick up the water as it is precipitated to the bottom of the separator, is neutralized by the baffle plate G, since it forces the current radially to its line of motion, but in a direction opposite to the direction of movement effected by the plate E, such actions on the moving current causing a constant throwing off effect at or near the outlet E, (very similar, figuratively speaking, to that of snapping a whip) and producing a constant effort of the current to enter at E to collect in the trap I from whence it passes to the collecting chamber J which may be equipped with any approved construction of water eliminating means.

To regulate the outflow of the collected fluid in trap I, the same has a side opening $h$ controlled by a valve H whose stem extends through the neck $a^2$ and has a suitable handle. Trap I also provides for the accumulation of sediment removed from the steam and it has a blow valve K that acts as an emergency device for the separator A, in case of an accident to the collecting chamber J and the eliminator devices with which the separator, in practice, coöperatively connects.

Having thus described my invention, what I claim is:

1. A condensation eliminator and separator, that comprises a steam separating chamber located in the distributing pipe of steam system, a collecting chamber below the separating chamber, a connection that joins the two chambers, said connection having a sediment pocket having a passage to the collecting chamber, a valve operable from the outside of the connection for controlling the passage to the collecting chamber and a valved blow off for the sediment pocket.

2. A condensation separator that comprises a baffle chamber for receiving and intercepting the flow of steam, said chamber having an integral pendent extension formed with a sediment collecting pocket and with a discharge, a valve mounted on the pendent extension for controlling the discharge, and a valved blow off connected with the sediment pocket.

3. In a separator and eliminator, a casing adapted for coupling with a steam service pipe, having baffles between the inlet and outlet passages, and having a pendent throat provided with a base flange, combined with a collecting casing having a flange at the upper end for coupling with the base flange of the throat portion of the other casing, said throat having a sediment pocket and having an escape port to the collecting case, a valve operable from the outside of the throat for controlling the escape port, and a blow off valve connected with the sediment pocket in the throat, all being arranged substantially as shown and described.

4. In a condensation eliminator, a casing having a chamber formed with an inlet at one side and an outlet at the other side, the bottom of the chamber between the inlet and outlet being of semi-circular shape, a trap in the said bottom, baffles between the inlet and outlet arranged to deflect the steam current first downwardly and forwardly against the chamber bottom and then upwardly and backwardly before it discharges from the chamber.

5. In a condensation separator, a casing having a chamber formed with an inlet at one side, an outlet at the opposite side, a semi-circular impacting surface at the bottom between the inlet and the outlet, means within the casing for directing the steam current forwardly and downwardly the semi-circular impacting surface as it passes from the inlet to the outlet, and a trap in the casing for collecting the condensation, said trap having an outlet.

6. In a condensation separator, a casing having a chamber formed with an inlet at one side, an outlet at the other side and a supplemental normally closed outlet at the top, the bottom of the chamber between the inlet and the outlet being a curved plane, a baffle for the inlet that extends from the top of the inlet downwardly and inwardly, and another baffle that extends from the bottom of the outlet upwardly and inwardly.

7. In a condensation separator, a casing having a chamber formed with an inlet at one side, and an outlet at the other side, and a supplemental normally closed outlet at the top, the bottom of the chamber between the inlet and the outlet being a curved plane, a baffle for the inlet that extends from the top of the inlet downwardly and inwardly, and another baffle that extends from the bottom of the outlet upwardly and inwardly, said chamber having a pocket in the bottom for the condensation.

8. In a condensation separator, a casing having a chamber formed with an outlet, at one side, an inlet at the other side, and a supplemental normally closed outlet at the top, the bottom of the chamber between the inlet and the outlet being a curved plane, a baffle for the inlet that extends from the top of the inlet downwardly and inwardly, and another baffle that extends from the bottom of the outlet upwardly and inwardly, said chamber having a pocket in the outlet end of the bottom.

9. In a condensation separator, a casing having a chamber formed with an inlet and an outlet, and a semi-circular bottom between the inlet and the outlet, a baffle within the chamber that extends inwardly and downwardly from the top of the inlet, another baffle that extends inwardly and upwardly from the bottom of the outlet, the inner ends of the two baffles extending beyond each other in a horizontal line.

10. In a condensation separator, a casing having a chamber formed with an inlet and an outlet, a semi-circular bottom that extends from the inlet to the outlet, a pocket in the bottom at the outlet side thereof, a baffle that extends from the top of the inlet inwardly and downwardly to the point substantially in line with the pocket and another baffle that projects inwardly and upwardly from the bottom of the outlet and whose inner end extends over and beyond the said pocket at the outer end of the other baffle.

WILLIAM AUSTIN.

Witnesses:
C. P. DELAHUNTY,
P. A. SAMMORE.